United States Patent
Kudo et al.

(10) Patent No.: US 10,655,000 B2
(45) Date of Patent: *May 19, 2020

(54) HYDROGEL FORMING COMPOSITION AND HYDROGEL FORMED THEREOF

(71) Applicants: NISSAN CHEMICAL INDUSTRIES, LTD., Tokyo (JP); RIKEN, Wako-shi, Saitama (JP)

(72) Inventors: Yoshihiro Kudo, Funabashi (JP); Taichi Nakazawa, Funabashi (JP); Takuzo Aida, Wako (JP); Yasuhiro Ishida, Wako (JP); Shingo Tamesue, Wako (JP); Masataka Ohtani, Wako (JP)

(73) Assignees: NISSAN CHEMICAL INDUSTRIES, LTD., Tokyo (JP); RIKEN, Saitamai (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/035,891

(22) PCT Filed: Nov. 10, 2014

(86) PCT No.: PCT/JP2014/079721
§ 371 (c)(1),
(2) Date: May 11, 2016

(87) PCT Pub. No.: WO2015/068837
PCT Pub. Date: May 14, 2015

(65) Prior Publication Data
US 2016/0272806 A1    Sep. 22, 2016

(30) Foreign Application Priority Data

Nov. 11, 2013  (JP) ................. 2013-233312

(51) Int. Cl.
| | |
|---|---|
| *C08L 33/02* | (2006.01) |
| *C08K 3/011* | (2018.01) |
| *C08K 3/34* | (2006.01) |
| *C08L 33/06* | (2006.01) |
| *C08J 3/075* | (2006.01) |
| *C08F 220/10* | (2006.01) |

(52) U.S. Cl.
CPC ............ *C08L 33/02* (2013.01); *C08F 220/10* (2013.01); *C08J 3/075* (2013.01); *C08K 3/011* (2018.01); *C08K 3/34* (2013.01); *C08L 33/06* (2013.01); *C08J 2333/02* (2013.01)

(58) Field of Classification Search
CPC ...................... C08J 2205/05–022; C08J 3/075
See application file for complete search history.

(56) References Cited

U.S. PATENT DOCUMENTS

| | | | | |
|---|---|---|---|---|
| 9,238,718 B2 * | 1/2016 | Kudo | ..................... | C08K 3/346 |
| 9,243,115 B2 * | 1/2016 | Kudo | ..................... | C08J 3/075 |
| 2005/0239942 A1 | 10/2005 | Herfert et al. | | |
| 2006/0165801 A1 * | 7/2006 | Ishii | ..................... | A61K 8/0212 |
| | | | | 424/487 |
| 2010/0239621 A1 * | 9/2010 | Tsujihata | ............. | A61K 8/0208 |
| | | | | 424/401 |
| 2014/0080955 A1 * | 3/2014 | Takeno | .................... | C08K 3/34 |
| | | | | 524/417 |
| 2014/0080956 A1 * | 3/2014 | Takeno | .................. | C08K 3/346 |
| | | | | 524/417 |

FOREIGN PATENT DOCUMENTS

| | | | | | |
|---|---|---|---|---|---|
| EP | | 2607404 A1 * | 6/2013 | ............. | C08J 3/075 |
| JP | | S60-226808 A | 11/1985 | | |
| JP | | 2002-053629 A | 2/2002 | | |
| JP | | 2005-536598 A | 12/2005 | | |
| JP | | 2009-096779 A | 5/2009 | | |
| JP | | 2009-270048 A | 11/2009 | | |
| WO | WO | 2006112533 A1 * | 10/2006 | .......... | B01J 13/0056 |
| WO | | 2011/001657 A1 | 1/2011 | | |
| WO | | 2012/072466 A1 | 6/2012 | | |

OTHER PUBLICATIONS

Zhou, C-H.; Tong, D.; Li, X.; Chapter 4: Synthetic hectorite: preparation, pillaring and applications in catalysis. Pilliared clays and related catalysis. Springer Science+Business Media, LLC. 2010. pp. 67-97.*
What is bentonite? Industrial Minerals Association. http://www.ima-na.org/?page=what_is_bentonite. As viewed on Apr. 20, 2017.*
Machine Translation of JP2009-096779A. May 7, 2009.*
Bailey, L. et al. Smectite clay—inorganic nanoparticle mixed suspensions: phase behaviour and rheology. Soft Matter, 2015, vol. 11, pp. 222-236. (Year: 2015).*
Bentonites. The James Hutton Institute: Clays and Minerals. http://www.claysandminerals.com/materials/bentonites. As viewed on Jul. 16, 2018. (Year: 2018).*
Definition of 'degree of polymerization'. IUPAC Goldbook. https://goldbook.iupac.org/html/D/D01569.html. As viewed on Feb. 11, 2019. (Year: 2019).*
Elasticity. The Physics Hypertextbook. https://physics.info/elasticity/. As viewed on Nov. 24, 2012. (Year: 2012).*

(Continued)

*Primary Examiner* — Stephen E Rieth
(74) *Attorney, Agent, or Firm* — Oliff PLC (57) ABSTRACT

An organic/inorganic composite hydrogel can be prepared only through mixing at a room temperature and that has high modulus of elasticity and a self-supporting property that allows a shape to be maintained in water, and a method produces the hydrogel. A hydrogel forming composition that is capable of forming a hydrogel having a self-supporting property, includes: a water-soluble organic polymer having an organic acid structure, an organic acid salt structure, or an organic acid anion structure; a silicate salt; a dispersant for the silicate salt; and a compound having or generating divalent or higher valent positive charge; a hydrogel formed of the composition, and a method for producing the hydrogel.

15 Claims, 5 Drawing Sheets

(56) References Cited

OTHER PUBLICATIONS

Takeno, H. et al., "Structural and Mechanical Properties of Composite Hydrogel Composed of Polymer and Nanoparticle," Polymer Preprints, 2012, p. 683, vol. 61, No. 1.
Dec. 2, 2014 International Search Report issued in International Patent Application No. PCT/JP2014/079721.
Dec. 2, 2014 Written Opinion of the International Searching Authority issued in International Patent Application No. PCT/JP2014/079721.
Jan. 4, 2018 Search Report issued in European Application No. 14 85 9792.5.
Jan. 4, 2018 Extended European Search Report issued in European Application No. 14859792.5.

* cited by examiner

HYDROGEL FORMING COMPOSITION AND HYDROGEL FORMED THEREOF

TECHNICAL FIELD

The present invention relates to a hydrogel, and more specifically, to an organic/inorganic composite hydrogel forming composition and an organic/inorganic composite hydrogel formed of the composition, the organic/inorganic composite hydrogel having high modulus of elasticity, and having a self-supporting property that allows a shape to be retained in water.

BACKGROUND ART

Hydrogels have been recently attracting attention from the viewpoint that hydrogels are soft materials having high biocompatibility because of containing water as the main component and having a low environmental load.

As a high-strength hydrogel having a self-supporting property, an organic/inorganic composite hydrogel is described that is obtained by performing a polymerization reaction of a (meth)acrylamide derivative in the coexistence with a layered clay mineral that is uniformly dispersed in water (Patent Document 1). As a similar example described, an organic/inorganic composite hydrogel is also known that contains a polymer partially containing a group of a carboxylate salt or a carboxy-anion structure in poly(meth)acrylamide and a clay mineral (Patent Document 2).

In these examples described, monomers are polymerized in an aqueous dispersion of a layered clay mineral, thereby causing a generated polymer and the clay mineral to form a three-dimensional network structure, which forms the organic/inorganic composite hydrogels.

However, the organic/inorganic composite hydrogels can leave unreacted monomers that may be toxic and reagents such as a polymerization initiator in the gels. It is difficult for non-chemical manufacturers to produce organic/inorganic composite hydrogels. It is also difficult to mold gels into a desired shape because hydrogels are formed after chemical reactions.

As an organic/inorganic composite hydrogel having a self-supporting property which can be produced through mixing at a room temperature, a hydrogel containing a dendrimer compound having a polycationic functional group at its terminal and a layered clay mineral has been known (Patent Document 3). In this example, the dendrimer is produced through multiple stages of synthetic reactions, and thus the production cost is high.

Also, an organic/inorganic composite hydrogels that can be prepared only by mixing a polyelectrolyte, clay particles, and a dispersant have been described (Non-Patent Document 1). In the organic/inorganic composite hydrogel, clay particles uniformly dispersed in a polyelectrolyte are cross-linked to form a gel structure. However, the gel is swollen in water, and thus strength and a shape cannot be maintained.

In addition, a gelation technique using a polyacrylic acid and an aluminum compound has been known (Patent Document 4). In this technique, the polyacrylic acid is cross-linked by aluminum ions to form a gel, and the gel is utilized as the plaster of cataplasms. This gel is gummy, and has excellent stickiness and flexibility; however, modulus of elasticity of the gel is low, and strength of the gel is not enough to maintain a shape against strong force.

PRIOR ART DOCUMENTS

Patent Documents

Patent Document 1: Japanese Patent Application Publication No. 2002-053629 (JP 2002-053629 A)
Patent Document 2: Japanese Patent Application Publication No. 2009-270048 (JP 2009-270048 A)
Patent Document 3: International Publication WO 2011/001657 Pamphlet
Patent Document 4: Japanese Patent Application Publication No. S60-226808 (JP S60-226808 A)

Non-Patent Documents

Non-Patent Document 1: Preprints of the 61st Annual Meeting of the Society of Polymer Science of Japan, Vol. 61, No. 1, p. 683 (2012)

SUMMARY OF THE INVENTION

Problem to be Solved by the Invention

In view of the above, there is a demand for a method of preparing an organic/inorganic composite hydrogel having high modulus of elasticity and a self-supporting property that allows a shape to be maintained in water by using industrially easily available raw materials and by simply mixing them at a room temperature.

The present invention has been achieved in view of the above circumstances, and an object thereof is to provide an organic/inorganic composite hydrogel that can be prepared only through mixing at a room temperature and that has high modulus of elasticity and a self-supporting property that allows a shape to be maintained in water. Another object thereof is to provide a method that can produce the organic/inorganic composite hydrogel by using industrially easily available raw materials.

Means for Solving the Problem

As a result of earnest study for resolving the above problems, the inventors of the present invention have found out that an organic/inorganic composite hydrogel having high modulus of elasticity and a self-supporting property that allows a shape to be maintained in water can be obtained by mixing a water-soluble organic polymer having an organic acid structure, an organic acid salt structure, or an organic acid anion structure; a silicate salt; a dispersant for the silicate salt; and a compound having or generating divalent or higher valent positive charge, and have achieved the present invention.

Specifically, the present invention relates to, as a first aspect, a hydrogel forming composition that is capable of forming a hydrogel having a self-supporting property, characterized by comprising: a water-soluble organic polymer (A) having an organic acid structure, an organic acid salt structure, or an organic acid anion structure; a silicate salt (B); a dispersant (C) for the silicate salt; and a compound (D) having or generating divalent or higher valent positive charge.

The present invention relates to, as a second aspect, the hydrogel forming composition according to the first aspect, in which the compound (D) is one or more selected from the group consisting of a salt of an element belonging to any one of Periods 3 to 5 and to any one of Groups 2 to 14 of the periodic table; a hydroxide of the element; an oxide of the element; a polyamine; and a salt of the polyamine.

The present invention relates to, as a third aspect, the hydrogel forming composition according to the second aspect, in which the element belongs to Group 2 or Group 13 of the periodic table.

The present invention relates to, as a fourth aspect, the hydrogel forming composition according to the second aspect or the third aspect, in which the compound (D) is one or more selected from the group consisting of a salt of magnesium, a hydroxide of magnesium, an oxide of magnesium, a salt of calcium, a hydroxide of calcium, an oxide of calcium, a salt of aluminum, a hydroxide of aluminum, an oxide of aluminum, a diamine, and a salt of a diamine.

The present invention relates to, as a fifth aspect, the hydrogel forming composition according to the fourth aspect, in which the compound (D) is one or more selected from the group consisting of magnesium chloride, magnesium bromide, magnesium sulfate, magnesium nitrate, magnesium carbonate, magnesium acetate, magnesium hydroxide, magnesium oxide, calcium chloride, calcium bromide, calcium sulfate, calcium nitrate, calcium carbonate, calcium acetate, calcium hydroxide, calcium oxide, calcium lactate, calcium phosphate, calcium diphosphate, calcium hexametaphosphate, aluminum sulfate, aluminum hydroxide, aluminum oxide, ethylenediamine, ethylenediamine dihydrochloride, ethylenediamine sulfate, bis(aminoethoxy)ethane, bis(aminoethoxy)ethane dihydrochloride, and bis(aminoethoxy)ethane sulfate.

The present invention relates to, as a sixth aspect, the hydrogel forming composition according to any one of the first to fifth aspects, in which the water-soluble organic polymer (A) is a water-soluble organic polymer having carboxylic acid, a carboxylate salt structure, or a carboxy anion structure.

The present invention relates to, as a seventh aspect, the hydrogel forming composition according to the sixth aspect, in which the water-soluble organic polymer (A) is a fully neutralized or partially neutralized polyacrylate salt.

The present invention relates to, as an eighth aspect, the hydrogel forming composition according to the seventh aspect, in which the water-soluble organic polymer (A) is a fully neutralized or partially neutralized polyacrylate salt having a weight average molecular weight of 1,000,000 to 10,000,000.

The present invention relates to, as a ninth aspect, the hydrogel forming composition according to any one of the first to eighth aspects, in which the silicate salt (B) is water-swellable silicate salt particles.

The present invention relates to, as a tenth aspect, the hydrogel forming composition according to the ninth aspect, in which the silicate salt (B) is water-swellable silicate salt particles selected from the group consisting of smectite, bentonite, vermiculite, and mica.

The present invention relates to, as an eleventh aspect, the hydrogel forming composition according to any one of the first to tenth aspects, in which the dispersant (C) is a dispersant for water-swellable silicate salt particles.

The present invention relates to, as a twelfth aspect, the hydrogel forming composition according to the eleventh aspect, in which the dispersant (C) is one or more selected from the group consisting of sodium orthophosphate, sodium pyrophosphate, sodium tripolyphosphate, sodium tetraphosphate, sodium hexametaphosphate, sodium polyphosphate, sodium poly(meth)acrylate, ammonium poly(meth)acrylate, a sodium acrylate/sodium maleate copolymer, an ammonium acrylate/ammonium maleate copolymer, sodium hydroxide, hydroxylamine, sodium carbonate, sodium silicate, polyethylene glycol, polypropylene glycol, sodium humate, and sodium ligninsulfonate.

The present invention relates to, as a thirteenth aspect, a hydrogel having a self-supporting property, formed of the hydrogel forming composition as described in any one of the first to twelfth aspects.

The present invention relates to, as a fourteenth aspect, a method for producing a hydrogel having a self-supporting property, characterized by comprising: mixing and gelatinizing the water-soluble organic polymer (A), the silicate salt (B), the dispersant (C), and the compound (D) each specified by any one of the first to twelfth aspects and water or a water-containing solvent.

The present invention relates to, as a fifteenth aspect, a method for producing a hydrogel having a self-supporting property, characterized by comprising: mixing and gelatinizing the water-soluble organic polymer (A), the silicate salt (B), and the dispersant (C), each specified by any one of the first to twelfth aspects and water or a water-containing solvent; and immersing an obtained gel in water or a water-containing solvent solution of the compound (D) specified by any one of the first to twelfth aspects.

Effects of the Invention

As described above, the present invention can provide a hydrogel having high modulus of elasticity and a self-supporting property that allows a shape to be maintained in water only by mixing raw materials that are industrially easily available. By pouring the hydrogel forming composition into a mold or extrusion molding before the gelatinization, a gel having a desired shape can be prepared. Any covalent bond forming reaction such as a polymerization reaction is not required for gelatinization, and the gelatinization can be performed even at a room temperature. Thus, the present invention has the effect of giving a high level of safety from the viewpoint of production processes. By adjusting the contents of the respective components, a hydrogel having any strength and transparency can be prepared.

The term "self-supporting property" of a hydrogel, which is usually used without being defined in academic papers and patent documents, is used in the present invention to mean that, because of having sufficient strength, the shape of a gel can be maintained even without a support such as a container.

The modulus of elasticity of the obtained hydrogel of the present invention can be measured with a piercing strength measuring apparatus, for example. For example, a cylindrical hydrogel having a diameter of 28 mm and a height of 16 mm is prepared, and measurement can be performed with CREEP METER RE2-33005B manufactured by Yamaden Co., Ltd. The method of measurement includes pressing a 3-mm diameter cylindrical shaft (a plunger manufactured by Yamaden Co., Ltd., shape: cylinder, No. 3S, P-3S model) against the top of the gel with a speed of 1 mm/second and measuring the stress. The modulus of elasticity can be calculated from the tilt of a region of a stress-strain curve, in which the distortion rate is small. The modulus of elasticity of a hydrogel obtained in the present invention with the piercing strength measuring apparatus is 5 kPa to 10,000 kPa. For uses requiring high modulus of elasticity, examples of the lower limit value thereof include 20 kPa, 50 kPa, and 100 kPa, and examples of the upper limit value thereof include 200 kPa, 1,000 kPa, and 5,000 kPa. Examples thereof include 20 kPa to 1,000 kPa and 100 kPa to 5,000 kPa.

MODES FOR CARRYING OUT THE INVENTION

Examples of components of the hydrogel forming composition and the hydrogel formed thereof according to the present invention include a water-soluble organic polymer (A) having an organic acid structure, an organic acid salt structure, or an organic acid anion structure; a silicate salt (B); a dispersant (C) for the silicate salt, and a compound (D) having or generating divalent or higher valent positive charge. In addition to the above components, any other components may be included as necessary to the extent that the intended effect of the present invention is not impaired.

Hydrogel Forming Composition

<Component (A): Water-Soluble Organic Polymer>

The component (A) according to the present invention is a water-soluble organic polymer having an organic acid structure, an organic acid salt structure, or an organic acid anion structure.

Examples of the a water-soluble organic polymer (A) having an organic acid structure, an organic acid salt structure, or an organic acid anion structure include, as ones having a carboxy group, poly(meth)acrylate salts, salts of carboxyvinyl polymers, and salts of carboxymethyl cellulose; as ones having a sulfonyl group, salts of polystyrene sulfonic acid; and, as ones having a phosphonyl group, polyvinyl phosphonate salts. Examples of the salts include sodium salts, ammonium salts, potassium salts, and lithium salts, and these salts may be fully neutralized or may be partially neutralized. The (meth)acrylic acid in the present invention refers to both acrylic acid and methacrylic acid.

In the present invention, the water-soluble organic polymer (A) preferably has a carboxylic acid structure, a carboxylate salt structure, or a carboxy anion structure. The water-soluble organic polymer (A) may be cross-linked or copolymerized, and both fully neutralized products and partially neutralized products thereof can be used.

The weight average molecular weight of the water-soluble organic polymer (A) is, in terms of polyethylene glycol by gel permeation chromatography (GPC), preferably 1,000,000 to 10,000,000, and more preferably 2,000,000 to 7,000,000.

Water-soluble organic polymers (A) available as commercial products have a weight average molecular weight labelled on the commercial products of preferably 1,000,000 to 10,000,000, and more preferably 2,000,000 to 7,000,000.

Among them, in the present invention, the water-soluble organic polymer (A) is preferably a fully neutralized or partially neutralized polyacrylate salt. Specifically, the water-soluble organic polymer (A) is preferably a fully neutralized or partially neutralized sodium polyacrylate and is particularly preferably a fully neutralized or partially neutralized non-cross-linked high polymerization degree sodium polyacrylate having a weight average molecular weight of 2,000,000 to 7,000,000.

The content of the water-soluble organic polymer (A) is 0.01% by mass to 20% by mass and preferably 0.1% by mass to 10% by mass relative to 100% by mass of the hydrogel.

This specification and other materials also use wt % as % by mass.

<Component (B): Silicate Salt>

The component (B) according to the present invention is a silicate salt and is preferably a water-swellable silicate salt particle.

Examples of the silicate salt (B) include smectite, bentonite, vermiculite, and mica, which preferably form a colloid with water or a water-containing solvent as a dispersant. The smectite is a group name of montmorillonite, beidellite, nontronite, saponite, hectorite, stevensite, and the like.

Examples of the shape of primary particles of the silicate salt particle include disc-like, plate-like, spherical, particulate, cubic, needle-like, rod-like, and amorphous. Disc-like or plate-like shape having a diameter of 5 nm to 1,000 nm is preferable.

Preferable specific examples of the silicate salt include a layered silicate salt; examples thereof easily available as commercial products include LAPONITE XLG (synthetic hectorite), XLS (synthetic hectorite containing sodium pyrophosphate as a dispersant), XL21 (sodium magnesium fluorosilicate), RD (synthetic hectorite), RDS (synthetic hectorite containing an inorganic polyphosphate salt as a dispersant), and S482 (synthetic hectorite containing a dispersant) manufactured by Rockwood Additives Ltd.; LUCENTITE (registered trademark of Co-op Chemical Co., Ltd.) SWN (synthetic smectite) and SWF (synthetic smectite), micro mica (synthetic mica), and SOMASIF (registered trademark of Co-op Chemical Co., Ltd., synthetic mica) manufactured by Co-op Chemical Co., Ltd.; KUNIPIA (registered trademark of Kunimine Industries Co., Ltd., montmorillonite), SUMECTON (registered trademark of Kunimine Industries Co., Ltd.) SA (synthetic saponite) manufactured by Kunimine Industries Co., Ltd.; and BENGEL (registered trademark of Hojun Co., Ltd., a refined product of natural bentonite) manufactured by Hojun Co., Ltd.

The content of the silicate salt (B) is 0.01% by mass to 20% by mass and preferably 0.1% by mass to 10% by mass relative to 100% by mass of the hydrogel.

<Component (C): Dispersant for Silicate Salt>

The component (C) according to the present invention is a dispersant for a silicate salt, preferably is a dispersant for water-swellable silicate salt particles.

As the dispersant (C) for silicate salts, dispersants or peptizers used for the purpose of improving the dispersability of silicate salts and delaminating layered silicate salts can be used.

Examples of the dispersant (C) for silicate salts include as phosphate-based dispersants, sodium orthophosphate, sodium pyrophosphate, sodium tripolyphosphate, sodium tetraphosphate, sodium hexametaphosphate, and sodium polyphosphate; as carboxylate-based dispersants, sodium poly(meth)acrylate, ammonium poly(meth)acrylate, a sodium acrylate/sodium maleate copolymer, and an ammonium acrylate/ammonium maleate copolymer; as ones acting as alkali, sodium hydroxide and hydroxylamine; as ones reacting with polyvalent cations to form insoluble salts or complex salts, sodium carbonate and sodium silicate; and as other organic peptizers, polyethylene glycol, polypropylene glycol, sodium humate, and sodium ligninsulfonate.

Among them, sodium pyrophosphate is preferable as phosphate-based dispersants; sodium polyacrylate having a weight average molecular weight of 1,000 to 20,000 is preferable as carboxylate-based dispersants; and polyethylene glycol (PEG 900 or the like) is preferable as other organic peptizers.

It is known that a low polymerization degree sodium polyacrylate having a weight average molecular weight of 1,000 to 20,000 functions as a dispersant by a mechanism including producing negative electric charges originated from carboxy anions on the surface of the particles through interactions with silicate salt particles and dispersing the silicate salt through the repulsion of the electric charges.

The content of the dispersant (C) is 0.001% by mass to 20% by mass and preferably 0.01% by mass to 10% by mass relative to 100% by mass of the hydrogel.

In the present invention, when using a silicate salt containing a dispersant as the component (B), the dispersant of the component (C) may be further added or may not be added.

<Component (D): Compound Having or Generating Divalent or Higher Valent Positive Charge>

The component (D) of the present invention is a compound having or generating divalent or higher valent positive charge. More specifically, the component (D) is a compound having divalent or higher valent positive charge on its own, or is a compound generating divalent or higher valent positive charge when the compound is dissolved in a solution or is reacted with an acid. Examples of such a compound include a salt of an element belonging to any one of Periods 3 to 5 and to any one of Groups 2 to 14 of the periodic table; a hydroxide of the element; an oxide of the element; a polyamine; and a salt of the polyamine. As the element of above, an element belongs to Group 2 or Group 13 of the periodic table is preferable.

As the salt of above, double salts such as alum and magnesium aluminosilicate can be used in addition to simple salts.

Examples of acids to form the salt include sulfuric acid, hydrochloric acid, hydrogen bromide, hydrogen fluoride, trifluoroacetic acid, acetic acid, phosphoric acid, diphosphoric acid, hexametaphosphoric acid, polyphosphoric acid, silicic acid, aluminate, trifluoromethanesulfonic acid, methanesulfonic acid, and p-toluenesulfonic acid.

Examples of the polyamine include ethylenediamine, diaminopropane, diaminobutane, diaminopentane, hexamethylene diamine, bis(aminoethoxy)ethane, phenylene diamine, hydrazine, spermidine, and spermine. The polyamine may be a free form or a salt form.

Examples of the compound (D) include a salt of magnesium, a hydroxide of magnesium, an oxide of magnesium, a salt of calcium, a hydroxide of calcium, an oxide of calcium, a salt of aluminum, a hydroxide of aluminum, an oxide of aluminum, a diamine, and a salt of a diamine. Among them, a salt of magnesium, a salt of calcium, and a salt of aluminum are preferable.

Specific examples of the compound (D) include magnesium chloride, magnesium bromide, magnesium sulfate, magnesium nitrate, magnesium carbonate, magnesium acetate, magnesium hydroxide, magnesium oxide, calcium chloride, calcium bromide, calcium sulfate, calcium nitrate, calcium carbonate, calcium acetate, calcium hydroxide, calcium oxide, calcium lactate, calcium phosphate, calcium diphosphate, calcium hexametaphosphate, aluminum sulfate, aluminum hydroxide, aluminum oxide, ethylenediamine, ethylenediamine dihydrochloride, ethylenediamine sulfate, bis(aminoethoxy)ethane, bis(aminoethoxy)ethane dihydrochloride, and bis(aminoethoxy)ethane sulfate. Among them, magnesium chloride, magnesium sulfate, calcium diphosphate, and aluminum sulfate are preferable.

The content of the compound (D) is 0.01% by mass to 20% by mass and preferably 0.05% by mass to 10% by mass relative to 100% by mass of the hydrogel.

At the time of gelation, the compound (D) can be mixed independently of other components or can be premixed with other components. Alternatively, a hydrogel prepared with the component (A) to the component (C) can be immersed in an aqueous solution of the compound (D).

A hydrogel containing the compound (D) has improved modulus of elasticity, and swelling of the hydrogel in water is largely suppressed.

A preferable combination of the water-soluble organic polymer (A), the silicate salt (B), the dispersant (C) for the silicate salt, and the compound (D) is, relative to 100% by mass of the hydrogel, 0.1% by mass to 10% by mass of a fully neutralized or partially neutralized non-cross-linked sodium polyacrylate having a weight average molecular weight of 2,000,000 to 7,000,000 as the component (A), 0.1% by mass to 10% by mass of water-swellable smectite or saponite as the component (B), 0.01% by mass to 10% by mass of sodium pyrophosphate or 0.01% by mass to 10% by mass of sodium polyacrylate having a weight average molecular weight of 1,000 to 20,000 as the component (C), and 0.05% by mass to 10% by mass of magnesium chloride or calcium diphosphate or aluminum sulfate as the component (D).

The hydrogel forming composition according to the present invention may contain monohydric or polyhydric alcohols such as methanol, ethanol, and ethylene glycol, formamide, hydrazine, dimethyl sulfoxide, urea, acetamide, potassium acetate, and the like that are intercalated between layers of the layered silicate salt to promote delamination.

<Water-Containing Alcohol and Water-Containing Polyhydric Alcohol>

The hydrogel forming composition and hydrogel of the present invention may contain a water-containing alcohol and a water-containing polyhydric alcohol.

Note that, in the present invention, the water-containing alcohol refers to a mixture of a monohydric alcohol and water, and the water-containing polyhydric alcohol refers to a mixture of a polyhydric alcohol and water.

The monohydric alcohol is preferably a water-soluble alcohol freely soluble in water and is more preferably a $C_{1-8}$ alcohol; specific examples thereof include methanol, ethanol, 2-propanol, i-butanol, pentanols, hexanols, 1-octanol, and iso-octanol.

The polyhydric alcohol is a dihydric or higher hydric alcohol; examples thereof include glycerin, polyglycerins (diglycerin, triglycerin, tetraglycerin, and the like), ethylene glycol, propylene glycol, polyethylene glycol (PEG 600 and the like), diethylene glycol, triethylene glycol, tetraethylene glycol, dipropylene glycols, 1,5-pentanediol (pentamethylene glycol), 1,2,6-hexanetriol, octylene glycol (ethohexadiol), butylene glycols (1,3-butylene glycol, 1,4-butylene glycol, 2,3-butanediol, and the like), hexylene glycols, 1,3-propanediol (trimethylene glycol), and 1,6-hexanediol (hexamethylene glycol). Glycerin, diglycerin, ethylene glycol, propylene glycol, and polyethylene glycol are preferable.

The content of the water-containing alcohol or the water-containing polyhydric alcohol is 0% by mass to 80% by mass and preferably 0% by mass to 60% by mass relative to 100% by mass of the hydrogel.

Meanwhile, the content of an alcohol in the water-containing alcohol or the water-containing polyhydric alcohol is 0.1% by mass to 80% by mass and preferably 0.1% by mass to 60% by mass relative to 100% by mass of the water-containing alcohol or the water-containing polyhydric alcohol.

Hydrogel and Method for Producing the Same

The hydrogel obtained from the hydrogel forming composition of the present invention can be produced by mixing and gelatinizing the water-soluble organic polymer (A), the silicate salt (B), the dispersant (C), and the compound (D), and water or a water-containing solvent. The hydrogel can be produced also by mixing and gelatinizing an aqueous solution of the water-soluble organic polymer (A) and an aqueous dispersion of the silicate salt (B) and the dispersant (C) for the silicate salt; and immersing the obtained gel in an aqueous solution of the compound (D). Further, the hydrogel forming composition of the present invention can be gelatinized also by adding the compound (D) to any one of, or both of an aqueous solution of the water-soluble organic polymer (A) and an aqueous dispersion of the silicate salt (B) and the dispersant (C) for the silicate salt; and mixing the aqueous solution and the aqueous dispersion.

A method for mixing the components of the hydrogel forming composition can be mechanical or manual stirring or ultrasonication, and among them, the mechanical stirring is preferable. For the mechanical stirring, for example, magnetic stirrers, propeller type stirrers, planetary centrifugal mixers, dispers, homogenizers, shakers, vortex mixers, ball mills, kneaders, line mixers, ultrasonic oscillators, or the like can be used. Among them, mixing with planetary centrifugal mixers is preferable.

The temperature while mixing is the freezing point to the boiling point of an aqueous solution or an aqueous dispersion, which is preferably −5° C. to 100° C. and more preferably 0° C. to 50° C.

Although the mixture is weak in strength and is sol-like immediately after mixing, it gelatinizes after being allowed to stand still. The time during which it is allowed to stand still is preferably 2 hours to 100 hours. The temperature at which it is allowed to stand still is −5° C. to 100° C. and preferably 0° C. to 50° C. By pouring the mixture into a mold or extrusion molding before the gelatinization, that is, immediately after mixing, a gel having a desired shape can be prepared.

EXAMPLES

The present invention will be described specifically with reference to examples. The present invention is not limited to the examples.

Production Example 1

Production of 9% LAPONITE XLG Aqueous Dispersion 7.5 parts of a low polymerization degree sodium polyacrylate (JURYMER AC-103: manufactured by Toagosei Co., Ltd., 40% aqueous solution, weight-average molecular weight of 6,000), 3 parts of urea (manufactured by Junsei Chemical Co., Ltd.), 0.5 parts of phenoxyethanol (manufactured by Junsei Chemical Co., Ltd.), and 74 parts of water were mixed and stirred at 25° C. until a uniform solution was produced. 9 parts of LAPONITE XLG (manufactured by Rockwood Additives Ltd.) was added to the solution little by little until the LAPONITE XLG was dispersed uniformly, and then 3 parts of a 10% aqueous solution of citric acid (manufactured by Junsei Chemical Co., Ltd.) was added thereto. The temperature of the mixture was allowed to be increased to 80° C. as stirring the mixture vigorously. The mixture was kept stirred at 80° C. for 30 minutes. The mixture was placed in an ice water bath, and was stirred as the temperature thereof was allowed to be decreased to 25° C. Then, 3 parts of 10% aqueous solution of citric acid (manufactured by Junsei Chemical Co., Ltd.) was added to the mixture, and the mixture was vigorously stirred at 25° C. for 1 hour to obtain a desired product.

Production Example 2

Production of 1.5% Sodium Polyacrylate Aqueous Solution 3 parts of urea (manufactured by Junsei Chemical Co., Ltd.), 0.5 part of phenoxyethanol (manufactured by Junsei Chemical Co., Ltd.), and 95 parts of water were mixed and stirred at 25° C. until a uniform solution was produced. 1.5 parts of a high polymerization degree sodium polyacrylate (VISCOMATE NP-800: manufactured by Showa Denko K. K., a 35% partially neutralized product) was added to the solution little by little as stirring the mixture vigorously. The mixture was kept stirred vigorously at 25° C. until a high polymerization degree sodium polyacrylate was completely dissolved (for about 5 hours) to obtain a desired product.

Production Example 3

Production of 1% Magnesium Chloride-Added 1.5% Sodium Polyacrylate Aqueous Solution 3 parts of urea (manufactured by Junsei Chemical Co., Ltd.), 0.5 parts of phenoxyethanol (manufactured by Junsei Chemical Co., Ltd.), 1 part of magnesium chloride (manufactured by Junsei Chemical Co., Ltd.), and 94 parts of water were mixed and stirred at 25° C. until a uniform solution was produced. 1.5 parts of a high polymerization degree sodium polyacrylate (VISCOMATE NP-800: manufactured by Showa Denko K. K., a 35% partially neutralized product) was added to the solution little by little as stirring the mixture vigorously. The mixture was kept stirred vigorously at 25° C. until a high polymerization degree sodium polyacrylate was completely dissolved (for about 5 hours) to obtain a desired product.

Production Example 4

Production of Hydrogel 1

67 parts of the 1.5% sodium polyacrylate aqueous solution produced in Production Example 2 was added to 33 parts of the 9% LAPONITE XLG aqueous dispersion produced in Production Example 1, and the mixture was vigorously stirred at 25° C. for 1 minute. The mixture was then allowed to stand still at 25° C. for 48 hours to obtain a desired product.

Production Example 5

Production of Sheet-Shaped Hydrogel 1

67 parts of the 1.5% sodium polyacrylate aqueous solution produced in Production Example 2 was added to 33 parts of the 9% LAPONITE XLG aqueous dispersion produced in Production Example 1, and the mixture was vigorously stirred at 25° C. for 1 minute. The mixture was poured into two glass plates with a silicon piece of 2 mm-thickness used as a spacer, and was then allowed to stand still for 24 hours to obtain a sheet-shaped hydrogel 1 of 2 mm-thickness.

Production Example 6

Production of Hydrogel 2

10 parts of LAPONITE XLS (manufactured by Rockwood Additives Ltd.) and 40 parts of water were mixed and stirred at 25° C. with a magnetic stirrer until a uniform aqueous dispersion was produced. Meanwhile, 1 part of sodium polyacrylate (manufactured by Wako Pure Chemical Industries, Ltd.: the polymerization degree is 22,000 to 70,000) and 49 parts of water were mixed and stirred at 25° C. with a magnetic stirrer until a uniform aqueous solution was produced. These two liquids were mixed, were stirred at 25° C. at 2,000 rpm for 10 minutes with a planetary centrifugal mixer (ARE-310 manufactured by Thinky Corporation), and were then allowed to stand still for 24 hours to obtain a desired product.

Example 1

Production of 0.3% Mg Hydrogel 33 parts of the 9% LAPONITE XLG aqueous dispersion produced in Production Example 1, 37 parts of the 1.5% sodium polyacrylate aqueous solution produced in Production Example 2, and 30 parts of a 1% magnesium chloride-added 1.5% sodium polyacrylate aqueous solution produced in Production Example 3 were mixed, and the mixture was vigorously stirred at 25° C. for 1 minute. The mixture was then allowed to stand still at 25° C. for 48 hours to obtain a desired product.

Example 2

Production of 0.5% Mg Hydrogel 33 parts of the 9% LAPONITE XLG aqueous dispersion produced in Production Example 1, 17 parts of the 1.5% sodium polyacrylate aqueous solution produced in Production Example 2, and 50 parts of a 1% magnesium chloride-added 1.5% sodium polyacrylate aqueous solution produced in Production Example 3 were mixed, and the mixture was vigorously stirred at 25° C. for 1 minute. The mixture was then allowed to stand still at 25° C. for 48 hours to obtain a desired product.

Example 3

Figure 12:
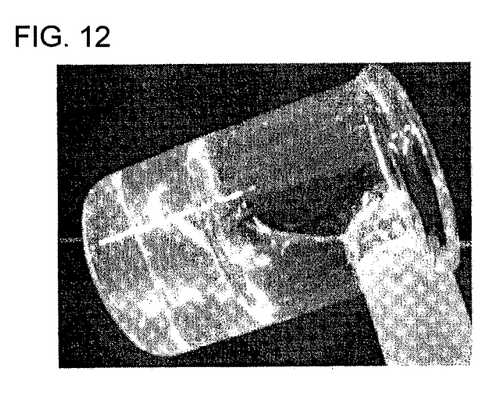
FIG. 12 is a photograph showing that a glass beaker containing a hydrogel obtained in Example 3 is tilted by using a glass rod.

Production of 0.3% Al Hydrogel 0.3 parts of anhydrous aluminum sulfate (manufactured by Kanto Chemical Co., Inc.) was added to 33 parts of the 9% LAPONITE XLG aqueous dispersion produced in Production Example 1, and the mixture was vigorously stirred at 25° C. until the mixture became uniform (for about 30 minutes). 66.7 parts of the 1.5% sodium polyacrylate aqueous solution produced in Production Example 2 was added thereto, and the mixture was vigorously stirred at 25° C. for 1 minute. The mixture was then allowed to stand still at 25° C. for 48 hours to obtain a desired product. The obtained 0.3% Al Hydrogel is shown in FIG. 12.

Example 4

Production of 0.5% Al Hydrogel 0.5 parts of anhydrous aluminum sulfate (manufactured by Kanto Chemical Co., Inc.) was added to 33 parts of the 9% LAPONITE XLG aqueous dispersion produced in Production Example 1, and the mixture was vigorously stirred at 25° C. until the mixture became uniform (for about 30 minutes). 66.5 parts of the 1.5% sodium polyacrylate aqueous solution produced in Production Example 2 was added thereto, and the mixture was vigorously stirred at 25° C. for 1 minute. The mixture was then allowed to stand still at 25° C. for 48 hours to obtain a desired product.

Example 5

Production of 1.0% Al Hydrogel 1 part of anhydrous aluminum sulfate (manufactured by Kanto Chemical Co., Inc.) was added to 33 parts of the 9% LAPONITE XLG aqueous dispersion produced in Production Example 1, and the mixture was vigorously stirred at 25° C. until the mixture became uniform (for about 30 minutes). 66 parts of the 1.5% sodium polyacrylate aqueous solution produced in Production Example 2 was added thereto, and the mixture was vigorously stirred at 25° C. for 1 minute. The mixture was then allowed to stand still at 25° C. for 48 hours to obtain a desired product.

Example 6

Production of 2.0% Al Hydrogel 2 parts of anhydrous aluminum sulfate (manufactured by Kanto Chemical Co., Inc.) was added to 33 parts of the 9% LAPONITE XLG aqueous dispersion produced in Production Example 1, and the mixture was vigorously stirred at 25° C. until the mixture became uniform (for about 30 minutes). 65 parts of the 1.5% sodium polyacrylate aqueous solution produced in Production Example 2 was added thereto, and the mixture was vigorously stirred at 25° C. for 1 minute. The mixture was then allowed to stand still at 25° C. for 48 hours to obtain a desired product.

Example 7

Production of 5% Mg-Immersed Sheet-Shaped Hydrogel 1

The sheet-shaped hydrogel 1 produced in Production Example 5 was immersed in a 5 wt % magnesium chloride aqueous solution, and was then allowed to stand still at 25° C. for 24 hours.

Example 8

Production of 5% Ca-Immersed Sheet-Shaped Hydrogel 1

The sheet-shaped hydrogel 1 produced in Production Example 5 was immersed in a 5 wt % calcium chloride aqueous solution, and was then allowed to stand still at 25° C. for 24 hours.

Example 9

Piercing Strength Test on Mg Hydrogel

Figure 1:
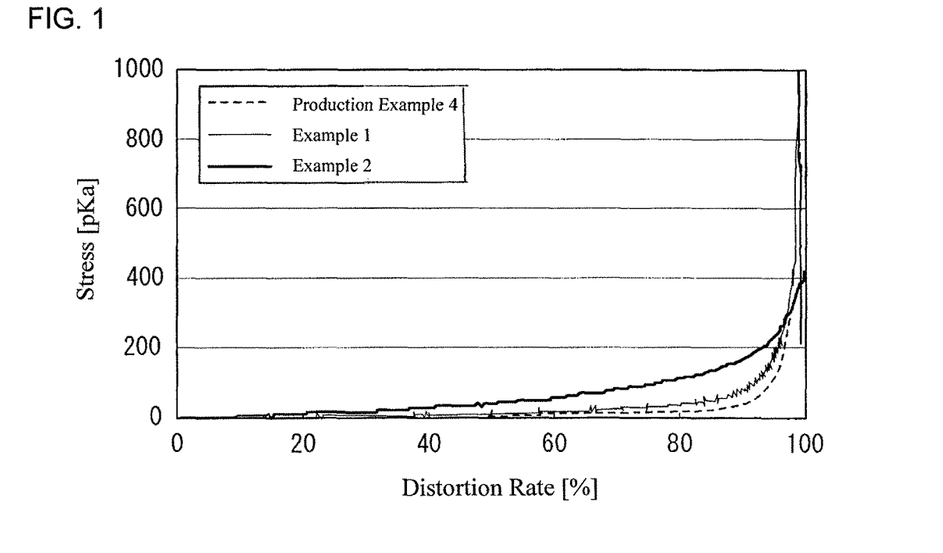
FIG. 1 is a diagram showing the measurement result of a piercing strength test in Example 9.

A cylindrical hydrogel having a diameter of 28 mm and a height of 16 mm was prepared under each of the conditions of Example 1, Example 2, and Production Example 4, and piercing strength measurement was performed thereon with CREEP METER RE2-33005B manufactured by Yamaden Co., Ltd. In the measurement, a 3-mm diameter cylindrical shaft (a plunger manufactured by Yamaden Co., Ltd., shape: cylinder, No. 3S, model: P-3S) was pressed against the top of the gel with a speed of 1 mm/second, and the distortion rate and the stress until rupture were measured. In addition, the modulus of elasticity was calculated from the tilt of a region of a stress-strain curve, in which the distortion rate was small. The measurement results are shown in Table 1 and FIG. 1.

TABLE 1

| | Mg Concentration [%] | Modulus of Elasticity [kPa] | Rupture Stress [kPa] | Rupture Distortion Rate [%] |
| --- | --- | --- | --- | --- |
| Production Example 4 | 0 | 13.6 | 938 | 98.6 |
| Example 1 | 0.3 | 26.0 | 1021 | 98.7 |
| Example 2 | 0.5 | 101 | 416 | 99.6 |

Example 10

Load Test on Mg Hydrogel

Figure 2:
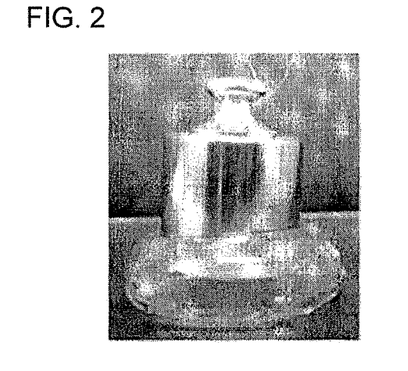
FIG. 2 is a photograph showing the result of a load test in Example 10.
Figure 3:
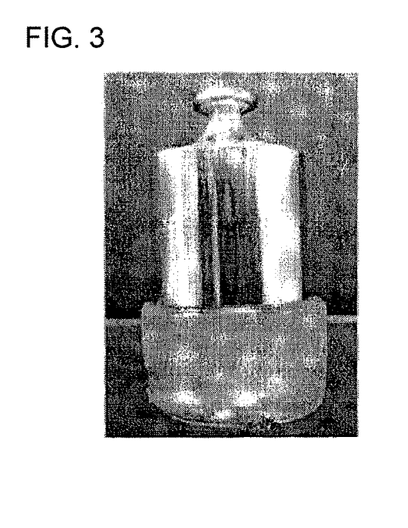
FIG. 3 is a photograph showing the result of a load test in Example 10.

A cylindrical hydrogel having a diameter of 28 mm and a height of 16 mm was prepared under each of the conditions of Example 2 and Production Example 4, and a 100 g-weight was placed thereon. The shape of the hydrogel according to Production Example 4 was largely deformed (FIG. 2). Deformation of the shape of the 0.5% Mg hydrogel according to Example 2 was hardly observed (FIG. 3).

Example 11

Piercing Strength Test on Al Hydrogel

Figure 4:
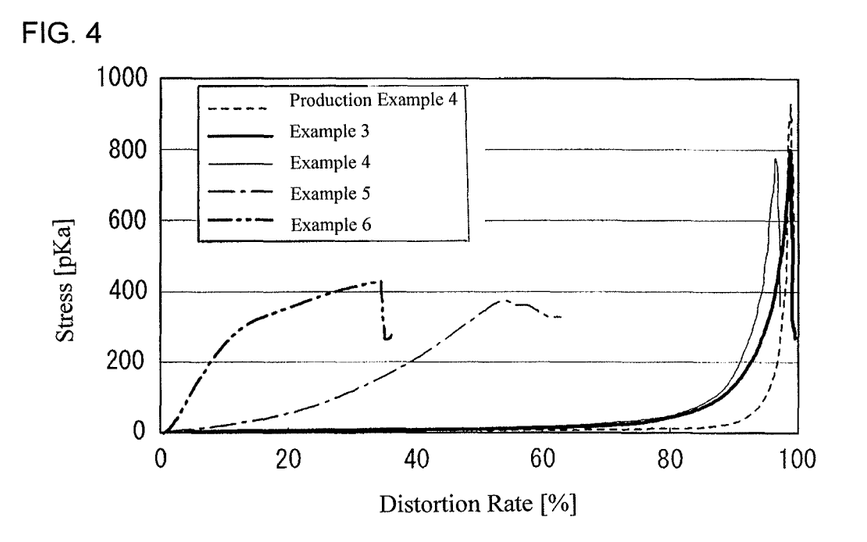
FIG. 4 is a diagram showing the measurement result of a piercing strength test in Example 11.

A cylindrical hydrogel having a diameter of 28 mm and a height of 16 mm was prepared under each of the conditions of Examples 3 to 6, and Production Example 4, and piercing strength measurement was performed thereon with CREEP METER RE2-33005B manufactured by Yamaden Co., Ltd. In the measurement, a 3-mm diameter cylindrical shaft (a plunger manufactured by Yamaden Co., Ltd., shape: cylinder, No. 3S, model: P-3S) was pressed against the top of the gel with a speed of 1 mm/second, and the distortion rate and the stress until rupture were measured. In addition, the modulus of elasticity was calculated from the tilt of a region of a stress-strain curve, in which the distortion rate was small. The measurement results are shown in Table 2 and FIG. 4.

TABLE 2

| | Al Concentration [%] | Modulus of Elasticity [kPa] | Rupture Stress [kPa] | Rupture Distortion Rate [%] |
| --- | --- | --- | --- | --- |
| Production Example 4 | 0 | 13.6 | 938 | 98.6 |
| Example 3 | 0.3 | 30.1 | 784 | 98.6 |
| Example 4 | 0.5 | 38.3 | 777 | 96.7 |
| Example 5 | 1.0 | 539 | 376 | 57.7 |
| Example 6 | 2.0 | 3155 | 431 | 33.9 |

Example 12

Piercing Strength Test on Sheet-Shaped Hydrogel 1

Figure 5:
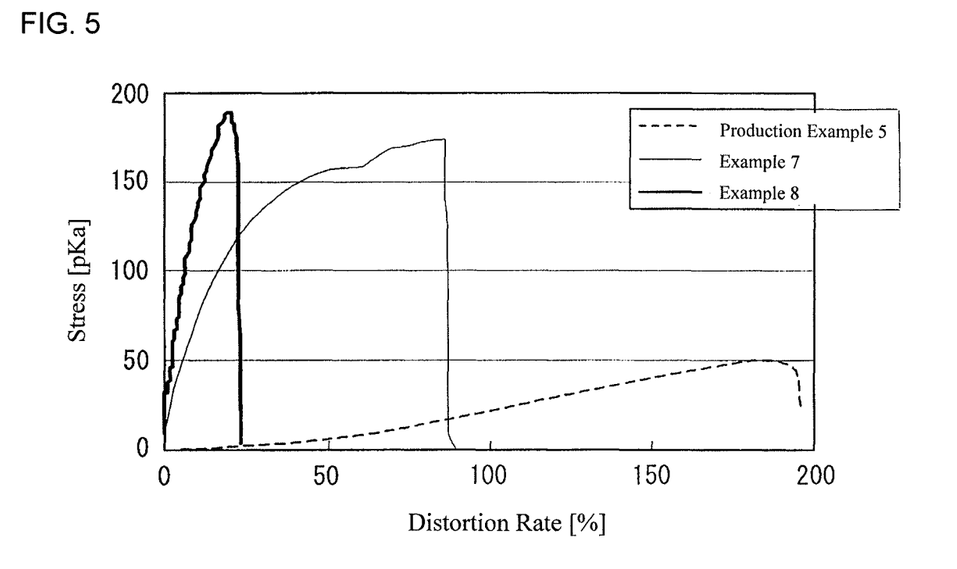
FIG. 5 is a diagram showing the measurement result of a piercing strength test in Example 12.

Piercing strength measurements were performed on sheet-shaped hydrogels produced according to the production methods of Example 7, Example 8, and Production Example 5. The measurement method was performed by using CREEP METER RE2-33005B manufactured by Yamaden Co., Ltd. In the measurement method, the sheet-shaped hydrogel was sandwiched between two plates on which circular holes having 23-mm diameters are opened, and a 3-mm diameter cylindrical shaft (a plunger manufactured by Yamaden Co., Ltd., shape: cylinder, No. 3S, model: P-3S) was pressed against the top of the circular hole with a speed of 1 mm/second, and the stress and the distortion rate until rupture were measured. The measurement results are shown in Table 3 and FIG. 5.

TABLE 3

| | Immersion | Rupture Stress [kPa] | Rupture Distortion Rate [%] |
| --- | --- | --- | --- |
| Production Example 5 | Nothing | 43.4 | 194 |
| Example 7 | 5% MgCl$_2$ | 174.3 | 85.7 |
| Example 8 | 5% CaCl$_2$ | 161.1 | 22.3 |

Example 13

Water Swelling Test on Al Hydrogel

Figure 6:
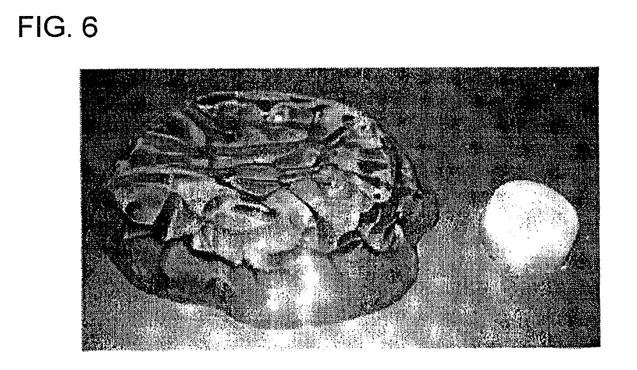
FIG. 6 is a photograph showing the result of a water swelling test in Example 13.
Figure 7:
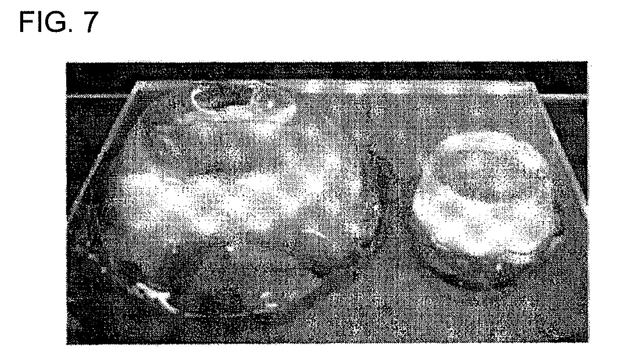
FIG. 7 is a photograph showing the result of a water swelling test in Example 13.
Figure 8:
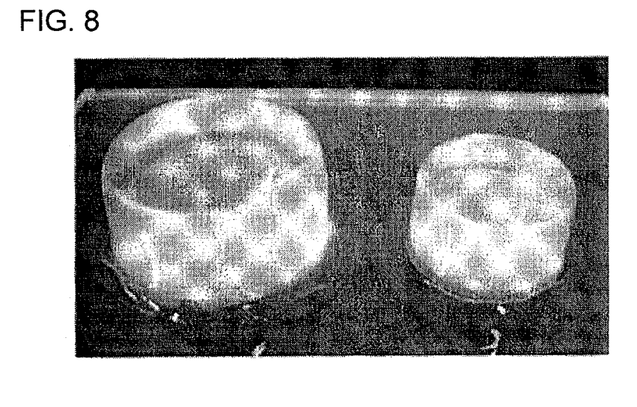
FIG. 8 is a photograph showing the result of a water swelling test in Example 13.
Figure 9:
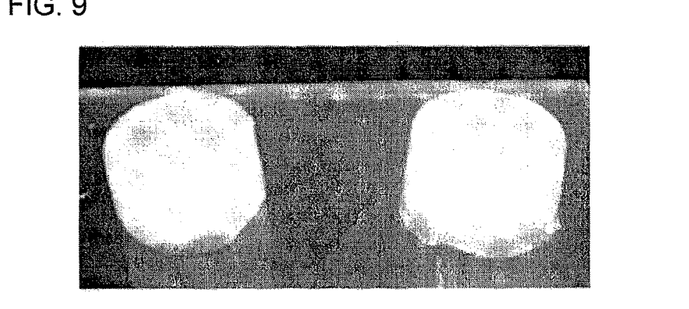
FIG. 9 is a photograph showing the result of a water swelling test in Example 13.

A cylindrical hydrogel having a diameter of 28 mm and a height of 16 mm was prepared under each of the conditions of Examples 4 to 6, and Production Example 4, and the hydrogel was immersed in 500 mL of pure water, and was then allowed to stand still at 25° C. for 3 days. The weight of the hydrogel was measured before and after immersion, and a swelling rate (a weight after immersion/a weight before immersion) was calculated. The results are shown in Table 4. Photographs of the hydrogels before and after immersion are shown in FIG. 6 (Production Example 4: from the left, after immersion, and before immersion), FIG. 7 (Example 4: from the left, after immersion, and before immersion), FIG. 8 (Example 5: from the left, after immersion, and before immersion), and FIG. 9 (Example 6: from the left, after immersion, and before immersion).

TABLE 4

|  | Al Concentration [%] | Swelling Rate [%] |
| --- | --- | --- |
| Production Example 4 | 0 | 14.0 |
| Example 4 | 0.5 | 4.9 |
| Example 5 | 1.0 | 1.7 |
| Example 6 | 2.0 | 1.0 |

Examples 14 to 17, and Comparative Example 1

Production of Immersed Hydrogel

The hydrogel 2 prepared in Production Example 6 was immersed in each of the aqueous solutions shown in Table 5 for 24 hours to obtain an immersed hydrogel.

TABLE 5

| Example | Aqueous Solution (Concentration) |
| --- | --- |
| Example 14 | Copper Sulfate (10%) |
| Example 15 | Calcium Chloride (10%) |
| Example 16 | Bis(aminoemoxy)ethane dihydrochloride (10%) |
| Example 17 | Magnesium Sulfate (10%) |
| Comparative Example 1 | Sodium Chloride (10%) |

Example 18

Piercing Strength Test on Immersed Hydrogel

Figure 10:
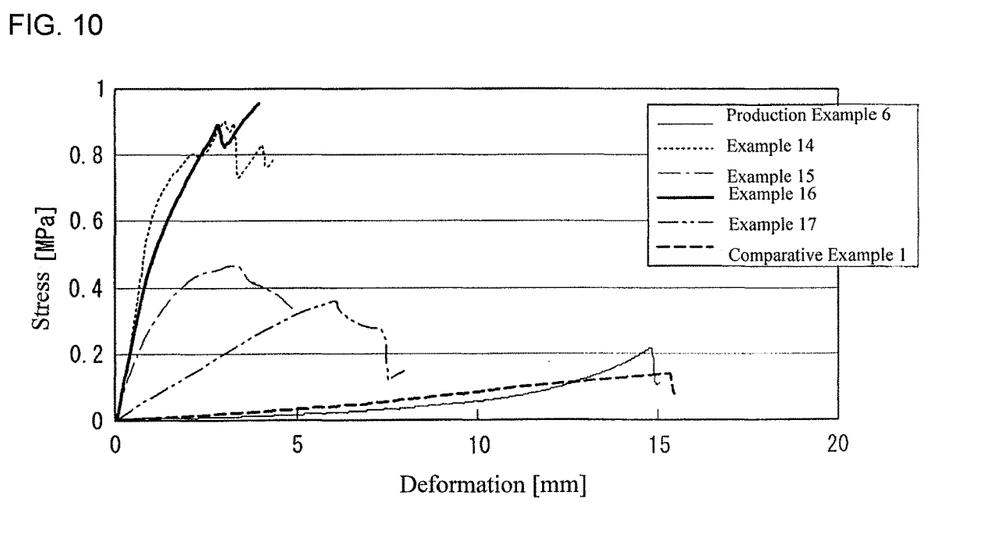
FIG. 10 is a diagram showing the measurement result of a piercing strength test in Example 18.

A cylindrical hydrogel having a diameter of 28 mm and a height of 16 mm was prepared under each of the conditions of Examples 14 to 17, Comparative Example 1, and Production Example 6, piercing strength measurement was performed thereon with CREEP METER RE2-33005B manufactured by Yamaden Co., Ltd. In the measurement, a 3-mm diameter cylindrical shaft (a plunger manufactured by Yamaden Co., Ltd., shape: cylinder, No. 3S, model: P-3S) was pressed against the top of the gel with a speed of 1 mm/second, and the distortion rate and the stress until rupture were measured. In addition, the modulus of elasticity was calculated from the tilt of a region of a stress-strain curve, in which the distortion rate was small. The measurement results are shown in Table 6 and FIG. 10.

TABLE 6

|  | Modulus of Elasticity [kPa] |
| --- | --- |
| Production Example 6 | 30.3 |
| Example 14 | 4677 |
| Example 15 | 2791 |
| Example 16 | 3843 |
| Example 17 | 1322 |
| Comparative Example 1 | 73.9 |

Comparative Example 2

Figure 11:
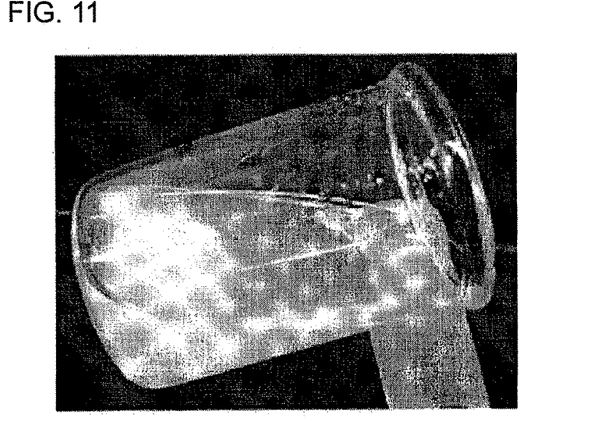
FIG. 11 is a photograph showing that a glass beaker containing gummy aggregate of white precipitate obtained in Comparative Example 2 is tilted by using a glass rod.

Non-Addition of LAPONITE XLG 33 parts of water were used instead of the 9% LAPONITE XLG aqueous dispersion used in Example 3, and a similar procedure was performed. As a result, gummy aggregate of white precipitate shown in FIG. 11 was obtained, but uniform gel such as the one obtained in Example 3, which is shown in FIG. 12, was not obtained.

INDUSTRIAL APPLICABILITY

The hydrogel of the present invention can easily be produced, and strength of the hydrogel, such as rupture strength and modulus of elasticity, can be adjusted by adjusting compositional components. Also, the obtained gel is highly transparent, and is elastic, so that the gel can easily be processed. By utilizing such characteristics, the hydrogel of the present invention can be applied to various products.

Examples of the products include medical materials such as external medicine bases such as wound dressing, cataplasms, and hemostatic materials, sealant materials for surgery, scaffold materials for regenerative medicine, implant materials such as artificial corneas, artificial lenses, artificial vitreous bodies, artificial skin, artificial joints, artificial cartilage, materials for breast augmentation, and materials for soft contact lenses; medium materials for tissue culturing, microbial culturing, and the like; cosmetic materials such as sheets for packing; sanitary materials such as diapers for children and adults and sanitary napkins; gel materials for aromatics and deodorants; confectionery and gum materials for dogs; materials for chromatographic carriers; materials for bioreactor carriers; materials for separation membranes; building/construction materials such as noncombustible materials for building materials, fireproofing covering materials, humidity control materials, aseismic buffer materials, mudflow preventing materials, and sandbags; greening materials such as soil water retention agents, raising seedling media, and agricultural and horticultural hydroponic supports; toy materials such as children's toys and models; materials for stationeries; shock absorbing materials for sporting goods such as sports shoes and protectors; cushion materials for shoe soles; buffer materials for bulletproof vests; buffer materials for automobiles and the like; buffer materials for transportation; packing materials; buffering/protecting mat materials; shock absorbers within electronic devices; buffer materials for transporting wagons for precision components such as optical devices and semiconductor-related components; vibration-proof/damping materials for industrial equipment; sound reduction materials for industrial equipment such as equipment using motor and compressors; environment-conscious materials such as rubber substitute materials for tires and rubber bands and plastic substitute materials; coating materials for frictional parts of devices; coating additives; waste disposal agents such as gelators for waste mud and lost circulation preventing agents; adhesives; sealants for sealing; electronic materials such as gel electrolyte materials for primary cells, secondary cells, and capacitors, gel electrolyte materials for dye-sensitized solar cells, and materials for fuel cells; and materials for photographic films.

The invention claimed is:

1. A hydrogel forming composition that is capable of forming a hydrogel having a self-supporting property, comprising:
    a water-soluble organic polymer having an organic acid structure, an organic acid salt structure, or an organic acid anion structure, and having a weight average molecular weight of 1,000,000 to 10,000,000;
    a silicate salt, comprising water-swellable silicate salt particles selected from the group consisting of smectite and vermiculite;
    a dispersant for the water-swellable silicate salt particles, comprising one or more selected from the group consisting of sodium polyacrylate having a weight average molecular weight of 1,000 to 20,000, ammonium poly(meth)acrylate, a sodium acrylate/sodium maleate copolymer, an ammonium acrylate/ammonium maleate copolymer, hydroxylamine, sodium carbonate, sodium silicate, polyethylene glycol, polypropylene glycol, sodium humate, and sodium ligninsulfonate; and
    a compound having or generating divalent or higher valent positive charge, which is one or more selected from the group consisting of magnesium chloride, magnesium bromide, magnesium sulfate, magnesium nitrate, magnesium carbonate, magnesium acetate, a hydroxide of magnesium, an oxide of magnesium, a salt of calcium, a hydroxide of calcium, an oxide of calcium, a salt of aluminum, a hydroxide of aluminum, an oxide of aluminum, a diamine, and a salt of a diamine.

2. The hydrogel forming composition according to claim 1, wherein the compound is one or more selected from the group consisting of magnesium chloride, magnesium bromide, magnesium sulfate, magnesium nitrate, magnesium carbonate, magnesium acetate, magnesium hydroxide, magnesium oxide, calcium chloride, calcium bromide, calcium sulfate, calcium nitrate, calcium carbonate, calcium acetate, calcium hydroxide, calcium oxide, calcium lactate, calcium phosphate, calcium diphosphate, calcium hexametaphosphate, aluminum sulfate, aluminum hydroxide, aluminum oxide, ethylenediamine, ethylenediamine dihydrochloride, ethylenediamine sulfate, bis(aminoethoxy)ethane, bis(aminoethoxy)ethane dihydrochloride, and bis(aminoethoxy)ethane sulfate.

3. The hydrogel forming composition according to claim 1, wherein the water-soluble organic polymer is a water-soluble organic polymer having a carboxylic acid structure, a carboxylate salt structure, or a carboxy anion structure.

4. The hydrogel forming composition according to claim 3, wherein the water-soluble organic polymer is a fully neutralized or partially neutralized polyacrylate salt.

5. The hydrogel forming composition according to claim 1, further comprising a water-containing alcohol, a water-containing polyhydric alcohol, or a mixture thereof.

6. The hydrogel forming composition according to claim 5, wherein the water-containing alcohol, water-containing polyhydric alcohol, or mixture thereof comprises alcohol in an amount of 0.1% by mass to 80% by mass, based on 100% by mass of the water-containing alcohol, water-containing polyhydric alcohol, or mixture thereof, the balance being water.

7. A method for producing a hydrogel having a self-supporting property from the hydrogel forming composition according to claim 1, comprising:
    mixing and gelatinizing the water-soluble organic polymer, the silicate salt, the dispersant for the water-swellable silicate salt particles, the compound having or generating divalent or higher valent positive charge and water or a water-containing solvent.

8. A hydrogel having a self-supporting property, formed from the hydrogel forming composition as claimed in claim 1.

9. The hydrogel according to claim 8, wherein the hydrogel comprises, based on 100% by mass of the hydrogel:
    the water-soluble organic polymer in an amount of 0.1% by mass to 20% by mass;
    the silicate salt in an amount of 0.01% by mass to 20% by mass;
    the dispersant in an amount of 0.001% by mass to 20% by mass; and
    the compound having or generating divalent or higher valent positive charge in an amount of 0.01% by mass to 20% by mass.

10. The hydrogel according to claim 8, wherein the hydrogel comprises, based on 100% by mass of the hydrogel:
    the water-soluble organic polymer in an amount of 0.1% by mass to 10% by mass;
    the silicate salt in an amount of 0.1% by mass to 10% by mass;
    the dispersant in an amount of 0.01% by mass to 10% by mass; and
    the compound having or generating divalent or higher valent positive charge in an amount of 0.05% by mass to 10% by mass.

11. The hydrogel according to claim 8, wherein the hydrogel exhibits a modulus of elasticity of 5 kPa to 10,000 kPa.

12. The hydrogel according to claim 11, wherein the modulus of elasticity of the hydrogel is 20 kPa to 10,000 kPa.

13. The hydrogel according to claim 8, wherein the hydrogel comprises, based on 100% by mass of the hydrogel:
    0.1% by mass to 20% by mass of the water-soluble organic polymer;
    0.01% by mass to 20% by mass of the silicate salt;
    0.001% by mass to 20% by mass of the dispersant for the water-swellable silicate salt particles;
    0.01% by mass to 20% by mass of the compound having or generating divalent or higher valent positive charge; and
    greater than 0% by mass to 80% by mass of a water-containing alcohol, a water-containing polyhydric alcohol, or a mixture thereof, the water-containing alcohol, water-containing polyhydric alcohol, or mixture thereof comprising alcohol in an amount of 0.1% by mass to 80% by mass, based on 100% by mass of the water-containing alcohol, water-containing polyhydric alcohol, or mixture thereof, the balance being water.

14. The hydrogel according to claim 13, wherein the hydrogel exhibits a modulus of elasticity of 5 kPa to 10,000 kPa.

15. The hydrogel according to claim 14, wherein the modulus of elasticity of the hydrogel is 20 kPa to 10,000 kPa.

* * * * *